(12) United States Patent
Crawford et al.

(10) Patent No.: US 8,505,277 B2
(45) Date of Patent: Aug. 13, 2013

(54) SYSTEM AND METHODS FOR CONTROLLING SELECTIVE CATALYTIC REDUCTION SYSTEMS

(75) Inventors: Kyle E. Crawford, Howell, MI (US); Jason Daniel Mullins, Brighton, MI (US)

(73) Assignee: GM Global Technology Operations LLC

( * ) Notice: Subject to any disclaimer, the term of this patent is extended or adjusted under 35 U.S.C. 154(b) by 405 days.

(21) Appl. No.: 12/536,687

(22) Filed: Aug. 6, 2009

(65) Prior Publication Data

US 2011/0030348 A1 Feb. 10, 2011

(51) Int. Cl.
*F01N 3/00* (2006.01)
(52) U.S. Cl.
USPC .................... 60/277; 60/285; 60/286; 60/311
(58) Field of Classification Search
USPC .............................. 60/277, 301, 286, 285, 311
See application file for complete search history.

(56) References Cited

U.S. PATENT DOCUMENTS

| | | | | |
|---|---|---|---|---|
| 3,882,451 | A * | 5/1975 | Fujishiro et al. | 340/449 |
| 6,523,341 | B1 * | 2/2003 | Rumpsa et al. | 60/277 |
| 7,797,927 | B2 * | 9/2010 | Nagaoka et al. | 60/277 |
| 2005/0050881 | A1 * | 3/2005 | Toshioka et al. | 60/285 |
| 2005/0252197 | A1 * | 11/2005 | Nieuwstadt et al. | 60/277 |
| 2007/0006570 | A1 * | 1/2007 | Gieshoff et al. | 60/277 |
| 2008/0178656 | A1 * | 7/2008 | Nieuwstadt et al. | 73/23.31 |
| 2008/0264037 | A1 * | 10/2008 | Takahashi et al. | 60/277 |
| 2009/0044517 | A1 * | 2/2009 | Oba | 60/285 |
| 2009/0158706 | A1 * | 6/2009 | Sun | 60/274 |
| 2009/0165444 | A1 * | 7/2009 | Oosumi | 60/286 |
| 2010/0077729 | A1 * | 4/2010 | Endo | 60/276 |
| 2010/0139246 | A1 * | 6/2010 | Andersson et al. | 60/276 |

FOREIGN PATENT DOCUMENTS

| | | | |
|---|---|---|---|
| WO | WO 2007060785 A1 * | 5/2007 | |
| WO | WO 2007069436 A1 * | 6/2007 | |
| WO | WO 2008103109 A1 * | 8/2008 | |
| WO | WO 2008123412 A1 * | 10/2008 | |

* cited by examiner

*Primary Examiner* — Thomas Denion
*Assistant Examiner* — Patrick Maines

(57) ABSTRACT

An engine system includes an aging factor generation module, a temperature comparison module, and a mode control module. The aging factor generation module generates an aging factor that indicates deterioration of a catalyst in a selective catalytic reduction (SCR) system. The temperature comparison module compares inlet and outlet temperatures of the SCR system to predetermined effective inlet and outlet temperatures of the SCR system, respectively, wherein the predetermined effective inlet and outlet temperatures are based on the aging factor. The mode control module controls at least one of a throttle and a plurality of fuel injectors based on a first predetermined air/fuel (A/F) ratio when the inlet and outlet temperatures of the SCR system are greater than the predetermined effective inlet and outlet temperatures of the SCR system, respectively.

25 Claims, 4 Drawing Sheets

SYSTEM AND METHODS FOR CONTROLLING SELECTIVE CATALYTIC REDUCTION SYSTEMS

FIELD

The present disclosure relates to engine emission control systems and more particularly to selective catalytic reduction (SCR) systems for diesel engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engines combust an air/fuel (A/F) mixture in cylinders that drive pistons that rotatably drive a crankshaft to produce drive torque. The combustion of the A/F mixture produces exhaust gas that includes nitrogen oxide (NOx). Therefore, diesel engine systems may include exhaust after-treatment systems that break down the NOx in the exhaust gas. For example, an exhaust after-treatment system may include a diesel oxidation catalyst (DOC), a diesel particulate filter (DPF), and/or a selective catalytic reduction (SCR) system.

In the SCR process, NOx reacts with a reductant when a dosing agent is injected by a dosing system into a flue or exhaust gas stream to be absorbed onto a SCR catalyst. For example, ammonia (NH3) may be the reductant resulting from a dosing agent that may be pure anhydrous ammonia, aqueous ammonia, or urea. In other words, the injected dosing agent (e.g. urea) may break down to form the ammonia (NH3), which reacts with the NOx. The following exemplary chemical relationships may illustrate the NOx reduction:

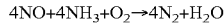

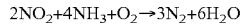

The SCR process may significantly reduce NOx, forming water vapor ($H_2O$) and nitrogen gas ($N_2$).

However, SCR requires a minimum temperature to operate efficiently (i.e. a minimum effective temperature). In other words, when an SCR system is operating at a temperature below the minimum effective temperature, NOx reduction may be inefficient. Additionally, when NOx reduction is incomplete, there may be a release of unreacted ammonia (NH3) into the exhaust stream. This may be referred to as "ammonia slip," and may have negative effects on emissions.

SUMMARY

An engine system includes an aging factor generation module, a temperature comparison module, and a mode control module. The aging factor generation module generates an aging factor that indicates deterioration of a catalyst in a selective catalytic reduction (SCR) system. The temperature comparison module compares inlet and outlet temperatures of the SCR system to predetermined effective inlet and outlet temperatures of the SCR system, respectively, wherein the predetermined effective inlet and outlet temperatures are based on the aging factor. The mode control module controls at least one of a throttle and a plurality of fuel injectors based on a first predetermined air/fuel (A/F) ratio when the inlet and outlet temperatures of the SCR system are greater than the predetermined effective inlet and outlet temperatures of the SCR system, respectively.

A method includes generating an aging factor that indicates deterioration of a catalyst in a selective catalytic reduction (SCR) system, comparing inlet and outlet temperatures of the SCR system to predetermined effective inlet and outlet temperatures of the SCR system, respectively, wherein the predetermined effective inlet and outlet temperatures are based on the aging factor, and controlling at least one of a throttle and a plurality of fuel injectors based on a first predetermined air/fuel (A/F) ratio when the inlet and outlet temperatures of the SCR system are greater than the predetermined effective inlet and outlet temperatures of the SCR system, respectively.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
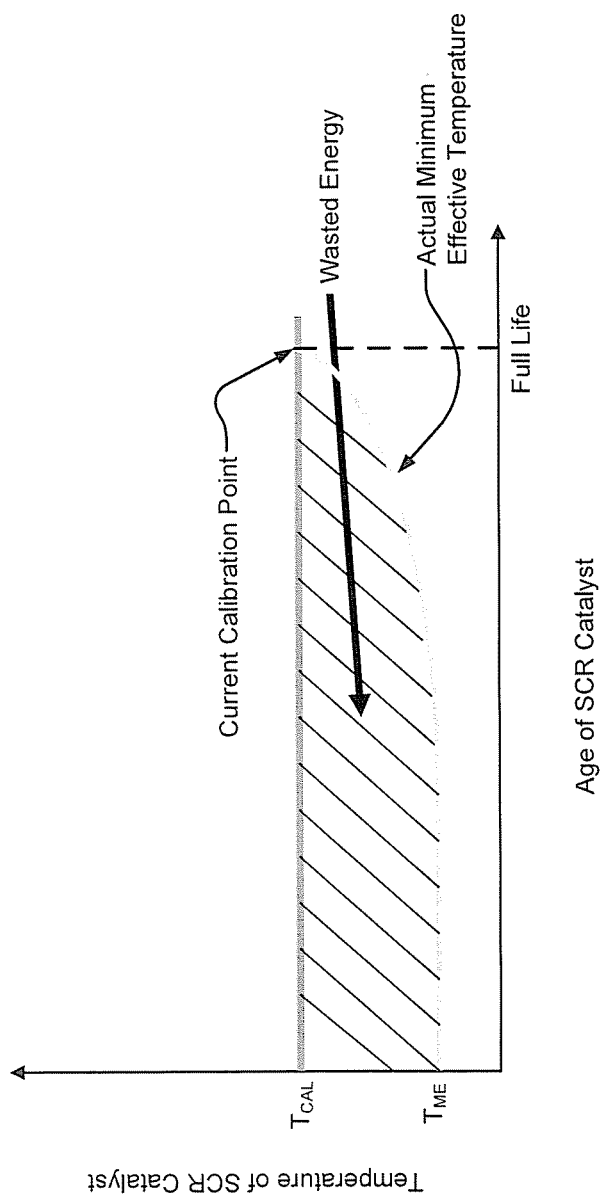
FIG. 1 is a graph illustrating energy losses from typical minimum effective temperature calibration.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory including one or more software or firmware programs, and/or a combinational logic circuit.

Referring now to FIG. 1, the minimum effective temperature of a selective catalytic reduction (SCR) system may increase during the life of the SCR system. In other words, a higher minimum effective temperature may be required at the end of a useful life of an SCR system than may be required for a new SCR system. Therefore, SCR systems may include calibration systems to compensate for the changing minimum effective temperature over the life of an SCR system.

Engine systems typically operate an engine in a low efficiency mode (i.e. SCR warm-up mode) until the minimum effective temperature is achieved. For example, the low efficiency mode may include operating the engine system with a richer A/F mixture than normally used. However, for emissions purposes, typical engine control systems may be calibrated with a minimum effective temperature corresponding to a full useful life of an SCR system (i.e. a fully used SCR system). In other words, the minimum effective temperature may be calibrated to a "worse-case" temperature. Thus, this calibration may result in wasted energy due to excessive heating during a majority of the life of the SCR system.

Therefore, a system and method for dynamically calibrating the minimum effective temperature of an SCR system throughout the lifetime of the SCR system are presented. The system and method for dynamically calibrating the minimum effective temperature of the SCR system may improve fuel economy, noise/vibration/harshness (NVH), emissions, and/or performance.

Figure 2:
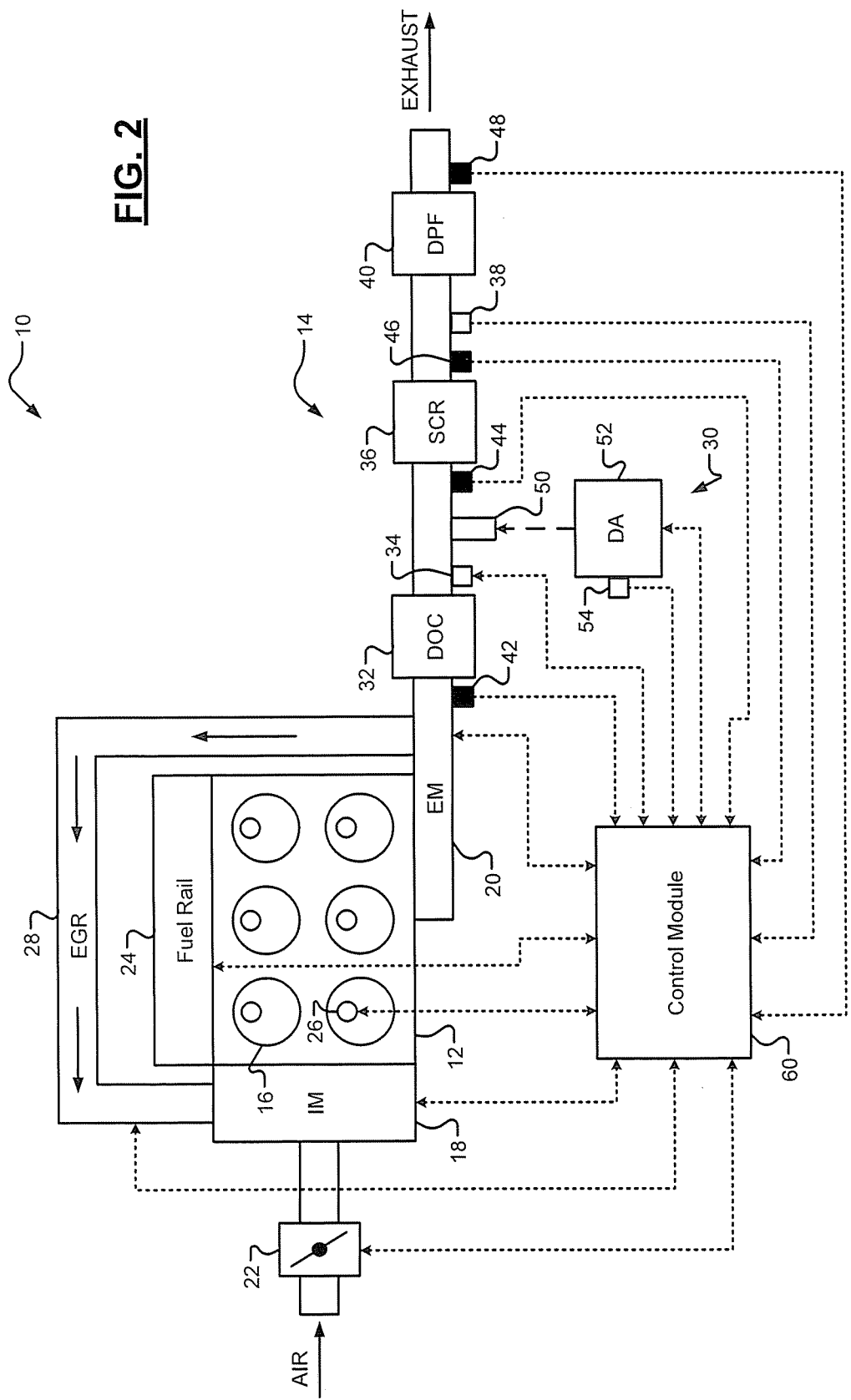
FIG. 2 is a functional block diagram of an engine system according to the present disclosure.

Referring now to FIG. 2, an engine system 10 is shown. The engine system 10 includes a diesel engine 12 and an exhaust treatment system 14. The engine 12 includes a plurality of cylinders 16, an intake manifold 18 and an exhaust manifold 20.

Air flows into the intake manifold 18 through a throttle 22. The air is mixed with fuel and the air and fuel (A/F) mixture is combusted within the cylinders 16 to drive pistons (not shown). Although six cylinders 16 are shown, the engine 12 may include 2, 3, 4, 5, 8, 10, 12 or 16 cylinders. The fuel may be provided from a fuel rail 24 and may be injected into the air stream using fuel injectors 26.

Exhaust is produced by the combustion process (e.g. compression ignition) and is vented from the cylinders 16 into the exhaust manifold 20. The engine system 10 may include an exhaust gas recirculation (EGR) system 28 that circulates exhaust gases back to the intake manifold 18. The exhaust treatment system 14 treats the exhaust gas to reduce emissions before being released into the atmosphere.

The exhaust treatment system 14 may include a dosing system 30, a diesel oxidation catalyst (DOC) 32, a first NOx sensor 34, a selective catalytic reduction (SCR) catalyst 36, a second NOx sensor 38, and a diesel particulate filter (DPF) 40. The DOC 32 reacts with the exhaust to reduce emission levels of the exhaust. The DPF 40 filters diesel particulates to further reduce emissions.

Additionally, the exhaust treatment system 14 may include temperature sensors $T_A$ 42, $T_B$ 44, $T_C$ 46, and $T_D$ 48 (collectively referred to as temperature sensors 42-48) that are located at various points along the emissions path. For example, temperature sensor $T_A$ 42 may be located upstream of the DOC 32, temperature sensor $T_B$ 44 may be located upstream of the SCR catalyst 36, temperature sensor $T_C$ 46 may be located downstream of the SCR catalyst 36 (i.e. upstream of the DPF 40), and $T_D$ 48 may be located downstream of the DPF 40. For example, the temperature sensors 42-48 may be used for feedback-based control of the exhaust treatment system 14.

The dosing system 30 includes a dosing agent injector 50, a dosing agent storage tank 52, and a dosing agent supply sensor 54. The dosing system 30 selectively injects a dosing agent (e.g. urea) into the exhaust stream to further reduce emissions. An injection rate at which the dosing agent is injected into the exhaust stream may be controlled based on the feedback from one or more of the various sensors described herein. For example, the NOx sensors 34, 38 may be used to determine NOx conversion efficiency and thus dosing agent quantities to be applied by the dosing agent injector 50. The exhaust and dosing agent mixture may then react within the SCR catalyst 36 to further reduce exhaust emissions.

After engine startup, a control module 60 may operate the engine system 10 in a special mode of operation (i.e. SCR warm-up mode) before switching to a normal mode of operation (i.e. normal operation mode). More specifically, the SCR warm-up mode may be an inefficient mode of operation directed to heating the SCR catalyst 36 quickly. For example, the SCR warm-up mode may include an enriched A/F mixture compared to an A/F mixture corresponding to the normal operation mode.

During the SCR warm-up mode, the control module 60 monitors input and output temperatures ($T_B$ 44 and $T_C$ 46, respectively) of the SCR catalyst 36. The control module 60 may determine when both the input temperature $T_B$ 44 and the output temperature $T_C$ 46 are greater than predetermined minimum effective temperature thresholds, as further described below. When the above-stated condition is true, the control module 60 may transition of operation of the engine system 10 to the normal operation mode. The normal operation mode may include a predetermined A/F ratio to optimize fuel economy, emissions, and/or performance.

Figure 3:
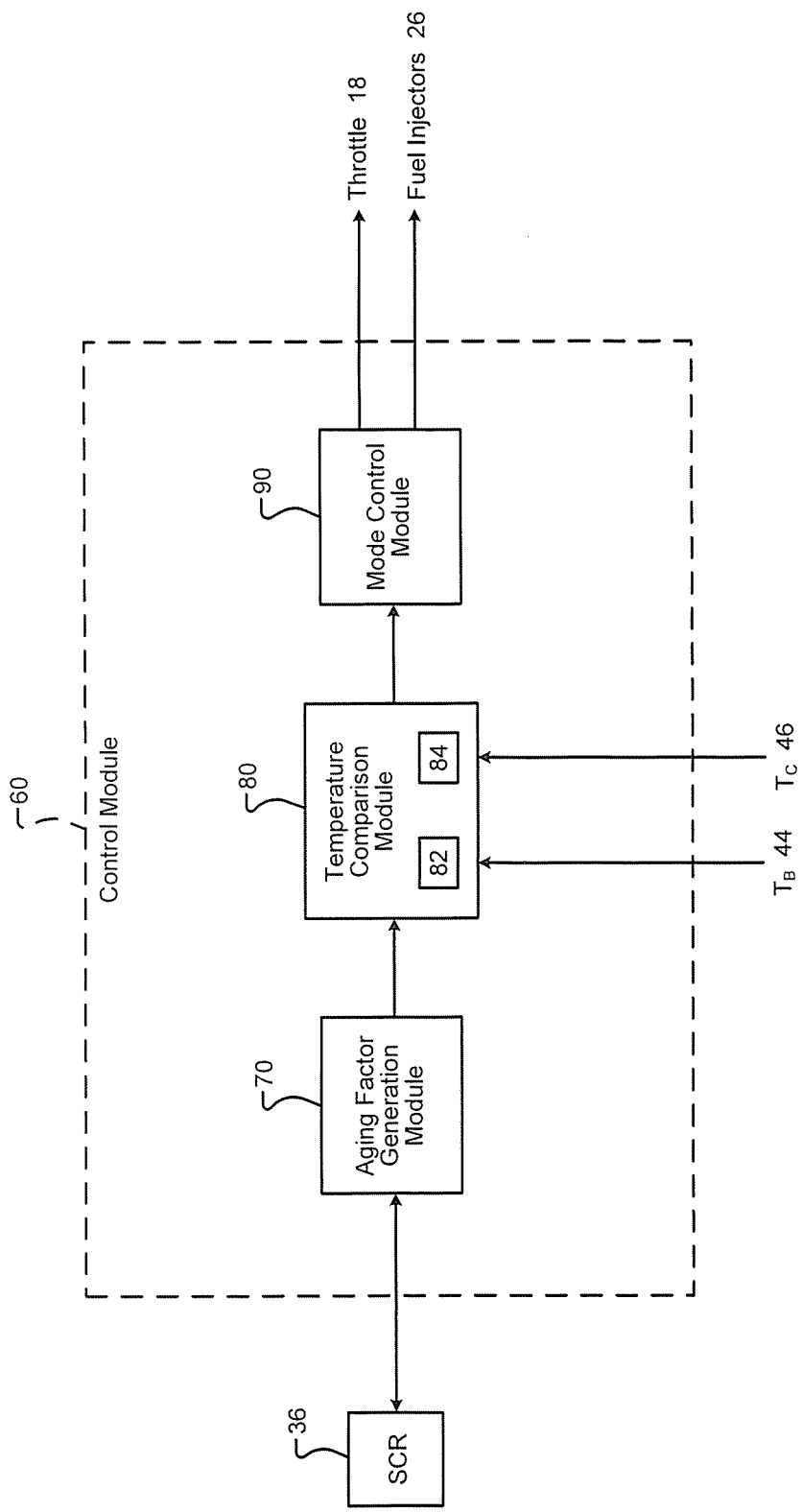
FIG. 3 is a functional block diagram of a control module according to the present disclosure.

Referring now to FIG. 3, the control module 60 is shown in more detail. The control module 60 may include an aging factor generation module 70, a temperature comparison module 80, and a mode control module 90. The temperature comparison module 80 may further include a minimum inlet temperature generation module 82 and a minimum outlet temperature generation module 84.

The aging factor generation module 70 generates an aging factor based on an age of the SCR catalyst 36. For example, the age of the SCR catalyst 36 may correspond to an amount of deterioration of the SCR catalyst 36. In other words, the SCR catalyst 36 may change over time due to changes in temperature, excessive temperature, exposure to urea, etc.

The temperature comparison module 80 receives the aging factor from the aging factor module 70. The temperature comparison module 80 also receives temperature signals $T_B$ 44 and $T_C$ 46, which correspond to inlet and outlet temperatures of the SCR catalyst 36, respectively.

The temperature comparison module 80 generates minimum effective inlet and outlet temperatures for the SCR catalyst 36 based on the aging factor. More specifically, the minimum inlet temperature generation module 82 may generate the minimum effective inlet temperature based on the aging factor. Additionally, the minimum outlet temperature generation module 84 may generate the minimum effective outlet temperature based on the aging factor. In one embodiment, the minimum inlet temperature generation module 82 and the minimum outlet temperature generation module 84 may include look-up tables that include predetermined temperature thresholds corresponding to different aging factors. The minimum inlet temperature generation module 82 may generate the minimum effective inlet temperature based on a first plurality of predetermined inlet temperatures corresponding to the aging factor. The minimum effective outlet temperature generation module 84 may generate the minimum effective outlet temperature based on a second plurality of predetermined outlet temperatures corresponding to the aging factor.

The first and second pluralities of predetermined temperatures may be based on an initial predetermined effective inlet temperature and an initial predetermined effective outlet temperature, respectively, and one of adding the aging factor to and subtracting the aging factor from the initial predetermined effective inlet and outlet temperatures. The first and second pluralities of predetermined temperatures may be based on an initial predetermined effective inlet temperature and an initial predetermined effective outlet temperature, respectively, and one of multiplying the initial predetermined effective inlet and outlet temperatures by and dividing the initial predetermined effective inlet and outlet temperatures by the aging factor. The first and second pluralities of predetermined temperatures may be based on an initial predetermined effective inlet temperature and an initial predetermined effective outlet temperature, respectively, the aging factor, and a predetermined function corresponding to the initial predetermined effective inlet and outlet temperatures and the aging factor.

The temperature comparison module 80 then compares the generated minimum effective inlet temperature ($T_{MEI}$) to temperature signal $T_B$ 44 and compares the generated minimum effective outlet temperature ($T_{MEO}$) to temperature signal $T_C$ 46. When both temperature signals TB 44, TC 46 are greater than or equal to the corresponding temperature thresholds, the temperature comparison module 80 may generate a normal operation mode enable signal. More specifically:

$T_B \geq T_{MEI}$ AND $T_C \geq T_{MEO} \rightarrow$ Normal Mode
Else$\rightarrow$SCR Warm-Up Mode The mode control module 90 receives the normal operation mode enable signal from the temperature comparison module 80. When the normal operation mode enable signal is in a first state, the mode control module 90 may continue operating the engine system 10 in SCR warm-up mode. For example, the first state may be a low signal (i.e. 0). When the normal operation mode enable signal is in a second state, the mode control module 90 may begin operating the engine system 10 in normal operation mode. For example, the second state may be a high signal (i.e. 1).

SCR warm-up mode may include a first predetermined A/F ratio corresponding to inefficient engine operation and faster heating of the SCR catalyst 36. Normal operation mode may include a second predetermined A/F ratio corresponding to optimal performance and/or efficiency. For example, the first predetermined A/F ratio may be less than the second predetermined A/F ratio (i.e. the first predetermined A/F ratio may be an enriched A/F mixture).

Figure 4:
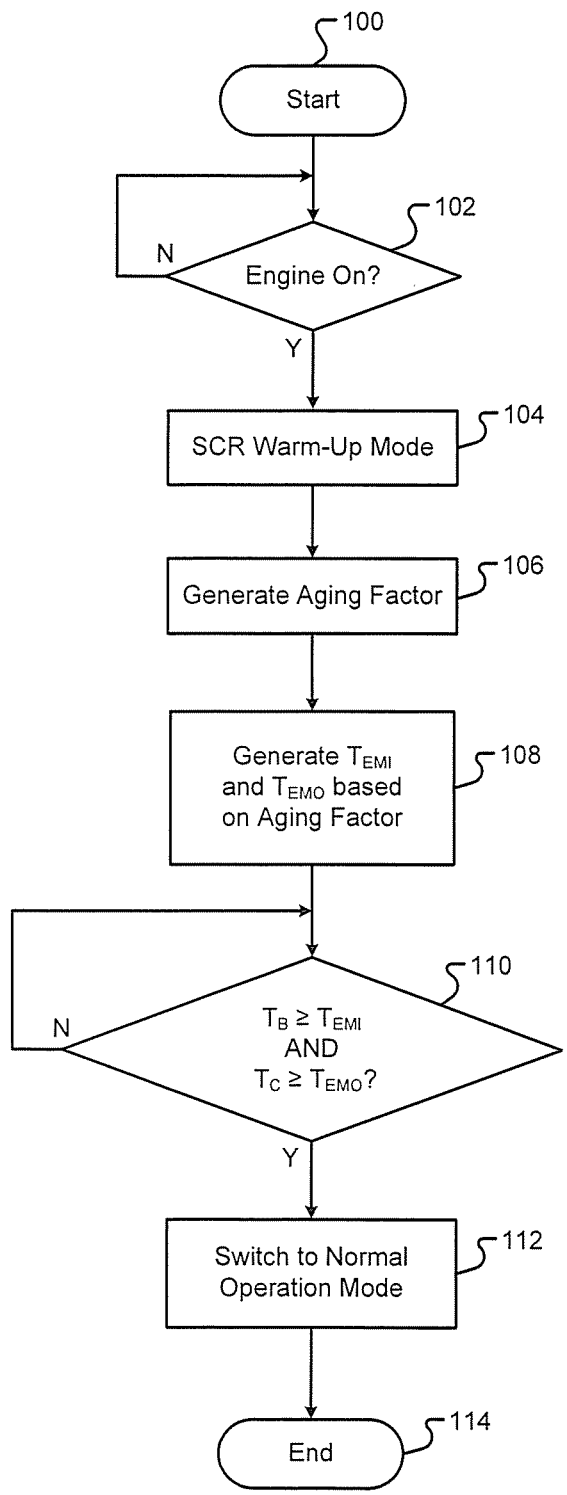
FIG. 4 is a flow diagram of a method of operating an engine system according to the present disclosure.

Referring now to FIG. 4, a flowchart illustrating steps performed by the control module 60 begins in step 100. In step 102, the control module 60 determines whether the engine 12 has been started. If false, control may return to step 102. If true, control may proceeds to step 104.

In step 104, the control module 60 begins operating the engine system 10 in SCR warm-up mode. In step 106, the control module 60 generates the aging factor based on the age (i.e. deterioration) of the SCR catalyst 36. In step 108, the control module 60 generates the minimum effective inlet and outlet temperatures ($T_{EMI}$ and $T_{EMO}$, respectively) based on the aging factor.

In step 110, the control module 60 compares the inlet and outlet temperatures of the SCR catalyst 36 ($T_B$ 44 and $T_C$ 46, respectively) to the generated minimum effective inlet and outlet temperatures ($T_{EMI}$ and $T_{EMO}$, respectively). If both temperatures $T_B$ 44 and $T_C$ 46 are greater than or equal to the minimum effective inlet and outlet temperatures ($T_{EMI}$ and $T_{EMO}$, respectively), then control may proceed to step 112. Otherwise, control may return to step 110.

In step 112, the control module 60 may switch the mode of operation of the engine system 10. In other words, the control module 60 may switch the mode of operation from SCR warm-up to normal operation mode, and control may end in step 114.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system, comprising:
an aging factor generation module that generates an aging factor based on an age of a catalyst in a selective catalytic reduction (SCR) system, wherein the age indicates an amount of deterioration of the catalyst in the SCR system;
a temperature comparison module that compares inlet and outlet temperatures of the SCR system to predetermined effective inlet and outlet temperatures of the SCR system, respectively, wherein the predetermined effective inlet and outlet temperatures are based on the aging factor; and
a mode control module that controls at least one of a throttle and a plurality of fuel injectors based on a first predetermined air/fuel (A/F) ratio when the inlet and outlet temperatures of the SCR system are greater than the predetermined effective inlet and outlet temperatures of the SCR system, respectively.

2. The engine system of claim 1, further comprising:
a predetermined inlet temperature generation module that generates the predetermined effective inlet temperature by selecting the predetermined effective inlet temperature from a first look-up table that relates a first plurality of predetermined inlet temperatures to different aging factors.

3. The engine system of claim 2, further comprising:
a predetermined outlet temperature generation module that generates the predetermined effective outlet temperature by selecting the predetermined effective outlet temperature from a second look-up table that relates a second plurality of predetermined temperatures to different aging factors.

4. The engine system of claim 1, wherein the mode control module controls the at least one of the throttle and the plurality of fuel injectors based on a second predetermined A/F ratio when one of the inlet and output temperatures are less than the predetermined effective inlet and outlet temperatures, respectively.

5. The engine system of claim 4, wherein the first predetermined A/F ratio is greater than the second predetermined A/F ratio.

6. The engine system of claim 1, further comprising:
the SCR system, wherein the SCR system injects a dosing agent into an exhaust stream when the inlet and outlet temperatures of the SCR system are greater than the predetermined effective inlet and outlet temperatures of the SCR system.

7. The engine system of claim 1, further comprising:
a diesel oxidation catalyst (DOC) that reacts with exhaust from an engine and generates particulates, wherein the DOC is located upstream along an exhaust stream relative to the SCR system; and
a diesel particulate filter (DPF) that filters the particulates generated by the DOC, wherein the DPF is located upstream along the exhaust stream relative to the SCR system and downstream along the exhaust stream relative to the DOC.

8. The engine system of claim 1, wherein initial effective inlet and outlet temperatures of the SCR system correspond to a new catalyst in the SCR system, and wherein the temperature comparison module determines the predetermined effective inlet and outlet temperatures of the SCR system based on the initial effective inlet and outlet temperatures of the SCR system and the aging factor.

9. A method, comprising:
generating an aging factor based on an age of a catalyst in a selective catalytic reduction (SCR) system, wherein the age indicates an amount of deterioration of the catalyst in the SCR system;
comparing inlet and outlet temperatures of the SCR system to predetermined effective inlet and outlet temperatures of the SCR system, respectively, wherein the predetermined effective inlet and outlet temperatures are based on the aging factor; and
controlling at least one of a throttle and a plurality of fuel injectors based on a first predetermined air/fuel (A/F) ratio when the inlet and outlet temperatures of the SCR system are greater than the predetermined effective inlet and outlet temperatures of the SCR system, respectively.

10. The method of claim 9, further comprising:
generating the predetermined effective inlet temperature by selecting the predetermined effective inlet temperature from a first look-up table that relates a first plurality of predetermined inlet temperatures to different aging factors.

11. The method of claim 10, further comprising:
generating the predetermined effective outlet temperature by selecting the predetermined effective outlet temperature from a second look-up table that relates a second plurality of predetermined temperatures to different aging factors.

12. The method of claim 9, further comprising:
controlling the at least one of the throttle and the plurality of fuel injectors based on a second predetermined A/F ratio when one of the inlet and output temperatures are less than the predetermined effective inlet and outlet temperatures, respectively.

13. The method of claim 12, wherein the first predetermined A/F ratio is greater than the second predetermined A/F ratio.

14. The method of claim 9, further comprising:
injecting a dosing agent into an exhaust stream using the SCR system when the inlet and outlet temperatures of the SCR system are greater than the predetermined effective inlet and outlet temperatures of the SCR system.

15. The method of claim 9, further comprising:
reacting a diesel oxidation catalyst (DOC) with exhaust from an engine and generating particulates, wherein the DOC is located upstream along an exhaust stream relative to the SCR system; and
filtering the particulates generated by the DOC using a diesel particulate filter (DPF), wherein the DPF is located upstream along the exhaust stream relative to the SCR system and downstream along the exhaust stream relative to the DOC.

16. The method of claim 9, wherein initial effective inlet and outlet temperatures of the SCR system correspond to a new catalyst in the SCR system, and wherein the predetermined effective inlet and outlet temperatures of the SCR system are determined based on the initial effective inlet and outlet temperatures of the SCR system and the aging factor.

17. A method for controlling an engine, the method comprising:
determining a degree of deterioration of a selective catalytic reduction (SCR) catalyst configured to treat exhaust gas produced by the engine;
determining a minimum effective inlet temperature of the SCR catalyst based on (i) an initial effective inlet temperature of the SCR catalyst when the SCR catalyst was new and (ii) the degree of deterioration;
determining a minimum effective outlet temperature of the SCR catalyst based on (i) an initial effective outlet temperature of the SCR catalyst when the SCR catalyst was new and (ii) the degree of deterioration;
monitoring an inlet temperature of the SCR catalyst using a first temperature sensor;
monitoring an outlet temperature of the SCR catalyst using a second temperature sensor;
commanding the engine to operate based on a first air/fuel ratio when at least one of the inlet temperature is less than the minimum effective inlet temperature and the outlet temperature is less than the minimum effective outlet temperature; and
commanding the engine to operate based on a second air/fuel ratio when both the inlet temperature is greater than or equal to the minimum effective inlet temperature and the outlet temperature is greater than or equal to the minimum effective outlet temperature, wherein the first air/fuel ratio is less than the second air/fuel ratio.

18. The method of claim 17, wherein the degree of deterioration of the SCR catalyst is determined based on an age of the SCR catalyst.

19. The method of claim 17, wherein the degree of deterioration of the SCR catalyst is determined based on changes in a temperature of the SCR catalyst during its lifetime.

20. The method of claim 17, wherein the degree of deterioration of the SCR catalyst is determined based on an exposure of the SCR catalyst to urea during its lifetime.

21. The method of claim 17, further comprising determining a factor for obtaining the minimum effective inlet and outlet temperatures of the SCR catalyst based on the degree of deterioration.

22. The method of claim 21, wherein the minimum effective inlet and outlet temperatures of the SCR catalyst are determined by adding or subtracting the factor to/from the initial effective inlet and outlet temperatures of the SCR catalyst.

23. The method of claim 22, wherein the minimum effective inlet and outlet temperatures of the SCR catalyst are determined by multiplying or dividing the factor with/by the initial effective inlet and outlet temperatures of the SCR catalyst.

24. The method of claim 21, wherein the minimum effective inlet and outlet temperatures of the SCR catalyst are determined using a predetermined function of the factor and the initial effective inlet and outlet temperatures of the SCR catalyst.

25. The method of claim 17, wherein the second air/fuel ratio is approximately a stoichiometric air/fuel ratio, and wherein the first air/fuel ratio is a rich air/fuel ratio.

* * * * *